United States Patent
Wang

(10) Patent No.: US 11,782,331 B2
(45) Date of Patent: Oct. 10, 2023

(54) FIXING BRACKET FOR PHOTOGRAPHING DEVICE

(71) Applicant: WELLPA PRECISION MOLD (SHENZHEN) CO., LTD., Shenzhen (CN)

(72) Inventor: Xing Wang, Shenzhen (CN)

(73) Assignee: WELLPA PRECISION MOLD (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 17/953,359

(22) Filed: Sep. 27, 2022

(65) Prior Publication Data

US 2023/0176454 A1    Jun. 8, 2023

(30) Foreign Application Priority Data

Dec. 7, 2021  (CN) .......................... 202123076452.2

(51) Int. Cl.
 *F16M 11/24* (2006.01)
 *G03B 17/56* (2021.01)
 *F16M 11/06* (2006.01)

(52) U.S. Cl.
 CPC ........... *G03B 17/561* (2013.01); *F16M 11/06* (2013.01); *F16M 11/242* (2013.01)

(58) Field of Classification Search
 CPC .... G03B 17/561; G03B 17/563; F16M 11/06; F16M 11/16; F16M 11/18; F16M 11/20; F16M 11/22; F16M 11/24; F16M 11/242; F16M 11/245; F16M 11/247; F16M 11/30; F16M 11/34; F16M 11/36; F16M 11/38
 See application file for complete search history.

(56) References Cited

U.S. PATENT DOCUMENTS

| 2007/0012160 A1* | 1/2007 | Sato ....................... F16M 11/10 |
| | | 84/421 |
| 2014/0151527 A1* | 6/2014 | Sawhney ............. F16M 11/247 |
| | | 248/125.1 |
| 2021/0123302 A1* | 4/2021 | Caldwell ................... E06C 1/22 |

FOREIGN PATENT DOCUMENTS

WO      WO-9323853 A1 * 11/1993   ............. F16M 11/10

* cited by examiner

*Primary Examiner* — Clayton E. LaBalle
*Assistant Examiner* — Fang-Chi Chang

(57) ABSTRACT

A fixing bracket for a photographing device includes a rod member, a sliding member, and a plurality of supporting feet. The sliding member is slidably sleeved on an outer surface of the rod member, top ends of the plurality of supporting feet are hinged to the sliding member, and the supporting feet are swingable with respect to the sliding member, at least one limiting protrusion is disposed on the outer surface of the rod member close to a bottom end of the rod member, the at least one limiting protrusion is configured to block the sliding member or the supporting feet from sliding towards the bottom end of the rod member, the at least one limiting protrusion is disposed between the sliding member and the bottom end of the rod member. When the sliding member slides towards the bottom end of the rod member, the supporting feet are gradually unfolded.

11 Claims, 5 Drawing Sheets

FIXING BRACKET FOR PHOTOGRAPHING DEVICE

TECHNICAL FIELD

The present disclosure relates to a field of fixing brackets for photographing devices, in particular to a fixing bracket for a photographing device which is capable of preventing supporting feet from excessively sliding to cause the supporting feet to be reversely folded or damaged.

BACKGROUND

In order to prevent photographing devices from shaking during a photographing process, fixing brackets are required for fixing the photographing devices. The fixing brackets each mainly includes a platform, a rod member, and support feet. The support feet are rotatably connected to a hinge member sleeved on the rod member, so that the support feet are capable of being unfolded or folded with respect to the rod member. An unfolding angle of the support feet is related to a position where the hinge member is disposed on the rod member, the closer the hinge member slides to a bottom end of the rod member, the larger the unfolding angle of the support feet. If there is no related limiting structure, when a user unfolds the support feet or during the photographing process, the supporting feet may be reversely folded (that is, the supporting feet face upward or are parallel to the platform) due to a too large unfolding angle, thereby causing the fixing brackets to lose a supporting function. Therefore, it is necessary to provide a fixing bracket for the photographing device which is capable of preventing the supporting feet from excessively sliding.

SUMMARY

The present disclosure aims to provide a fixing bracket for a photographing device, which is capable of preventing supporting feet from excessively sliding, thereby avoiding a problem that the supporting feet may be reversely folded or damaged.

The present disclosure provides a fixing bracket for a photographing device, including a rod member, a sliding member, and a plurality of supporting feet, the sliding member is slidably sleeved on an outer surface of the rod member, top ends of the plurality of supporting feet are hinged to the sliding member, and the supporting feet are swingable with respect to the sliding member. At least one limiting protrusion is disposed on the outer surface of the rod member close to a bottom end of the rod member, the at least one limiting protrusion is configured to block the sliding member or the supporting feet from sliding towards the bottom end of the rod member, the at least one limiting protrusion is disposed between the sliding member and the bottom end of the rod member.

Furthermore, the at least one limiting protrusion is at least one structure outwardly protruding from the rod member.

Furthermore, the at least one limiting protrusion is at least one convex hull on the outer surface of the rod member.

Furthermore, the at least one limiting protrusion is an annular convex rib surrounding the outer surface of the rod member.

Furthermore, the at least one limiting protrusion is a sleeve sleeved on the rod member, a tail plug is disposed at the bottom end of the rod member, and the tail plug is configured to block the sleeve from sliding away from the rod member.

Furthermore, the sliding member is a hinge member, hinge holes are defined in a circumferential direction of the hinge member, and the hinge holes are configured to be hinged with the supporting feet.

Furthermore, the sliding member includes a hinge member and a sliding sleeve, the sliding sleeve is fixedly embedded in an inner ring of the hinge member, and the sliding sleeve is sleeved on an outer periphery of the rod member.

Furthermore, the sliding member is a cylinder for installing a remote control.

Furthermore, the fixing bracket for the photographing device further includes a supporting frame, the supporting frame includes a plurality of connecting rods, top ends of the plurality of the connecting rods are hinged with the supporting feet, and bottom ends of the plurality of the connecting rods are hinged with the bottom end of the rod member.

Furthermore, at least one sliding groove is defined on the outer surface of the rod member along an axial direction of the rod member, at least one guide protrusion with respect to the at least one sliding groove is disposed on the sliding member, the at least one guide protrusion is embedded in the at least one sliding groove, and the at least one limiting protrusion is disposed in the at least one sliding groove and is capable of abutting against the at least one guide protrusion.

Compared with the prior art, the present disclosure has beneficial effects as follows.

The present disclosure provides the fixing bracket of the photographing device, where the at least one limiting protrusion is disposed on the outer surface of the rod member close to the bottom end of the rod member, the at least one limiting protrusion is configured to block the sliding member or the supporting feet from sliding towards the bottom end of the rod member, the at least one limiting protrusion is disposed between the sliding member and the bottom end of the rod member. When the sliding member slides towards the bottom end of the rod member, the supporting feet are gradually unfolded, when the sliding member slides to a position where the sliding member spatially interferes with the at least one limiting protrusion, the at least one limiting protrusion blocks the sliding member from continuing to slide towards the bottom end of the rod member. Since the sliding member is hinged to bottom ends of the supporting feet 4, when the sliding member stops sliding, an unfolding angle of the supporting feet is also kept fixed, so that the problem that the supporting feet are reversely folded or damaged due to the too large unfolding angle is prevented, and a stable supporting function of the fixing bracket is ensured.

DETAILED DESCRIPTION

Figure 1:
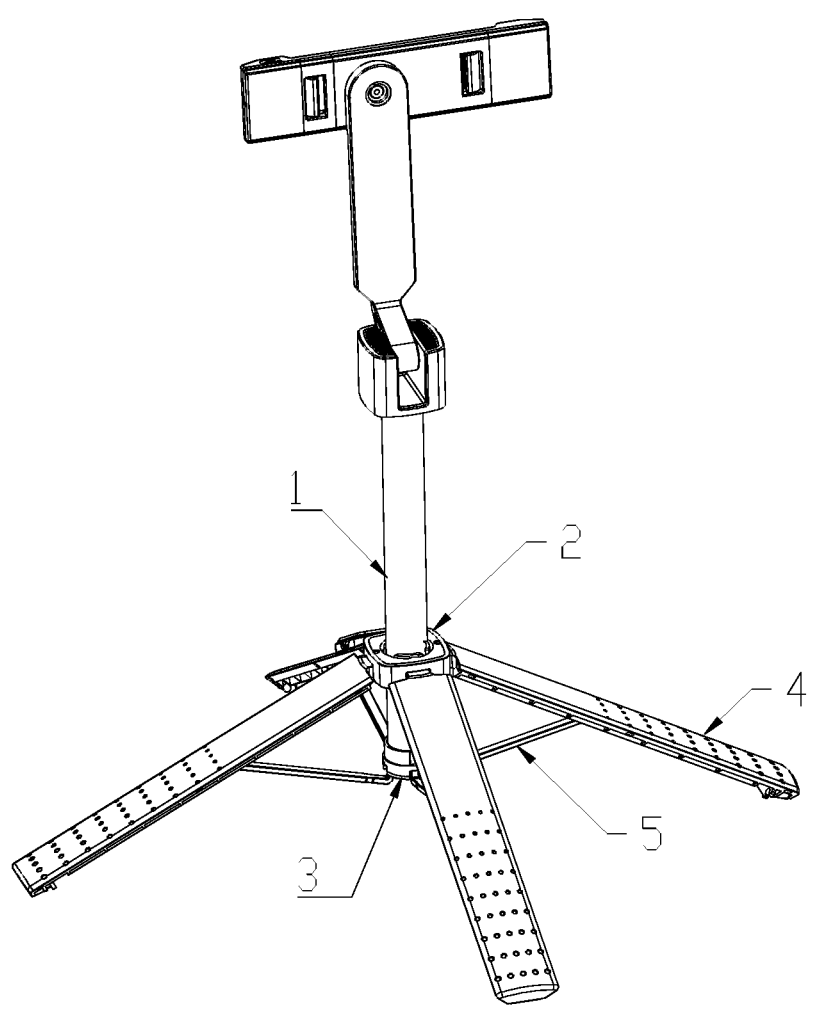
FIG. 1 is a structural schematic structural diagram of a fixing bracket for a photographing device according to a first embodiment of the present disclosure.

In order to make objectives, technical solutions, and advantages of the present disclosure clearer, the present disclosure is further described in detail with reference to accompanying drawings and embodiments. It should be understood that the specific embodiments described herein are merely used to explain the present disclosure and are not intended to limit the present disclosure.

In the descriptions of the present disclosure, terms "center", "upper", "lower", "left", "right", "vertical", "horizontal", "inner", "outer", and other indicated directions or the position relation are based on the orientation or position relation shown in the drawings. Only for convenience of describing the present disclosure and simplification of the description, rather than indicating or implying that indicated apparatus or elements referred to have a specific orientation, be constructed and operated in a specific orientation, so that the above directions of the present disclosure cannot be understood as limitations. Terms "first", "second", "third", are only used for descriptive purposes and are not to be construed as indicating or implying relative importance. In addition, unless expressly specified and defined otherwise, terms "dispose", "connect", "connect with", "fix" and the like are to be construed broadly, for example, may be fixedly connected, may be detachably connected, or integrally connected, may be a mechanical connection, or may be an electrical connection, may be directly connected, may also be indirectly connected by an intermediate medium, or may be in communication with an interior of two components. Specific meanings of the above-described terms in the present disclosure may be understood by those who skilled in the art based on the specific circumstances.

First Embodiment

Figure 2:
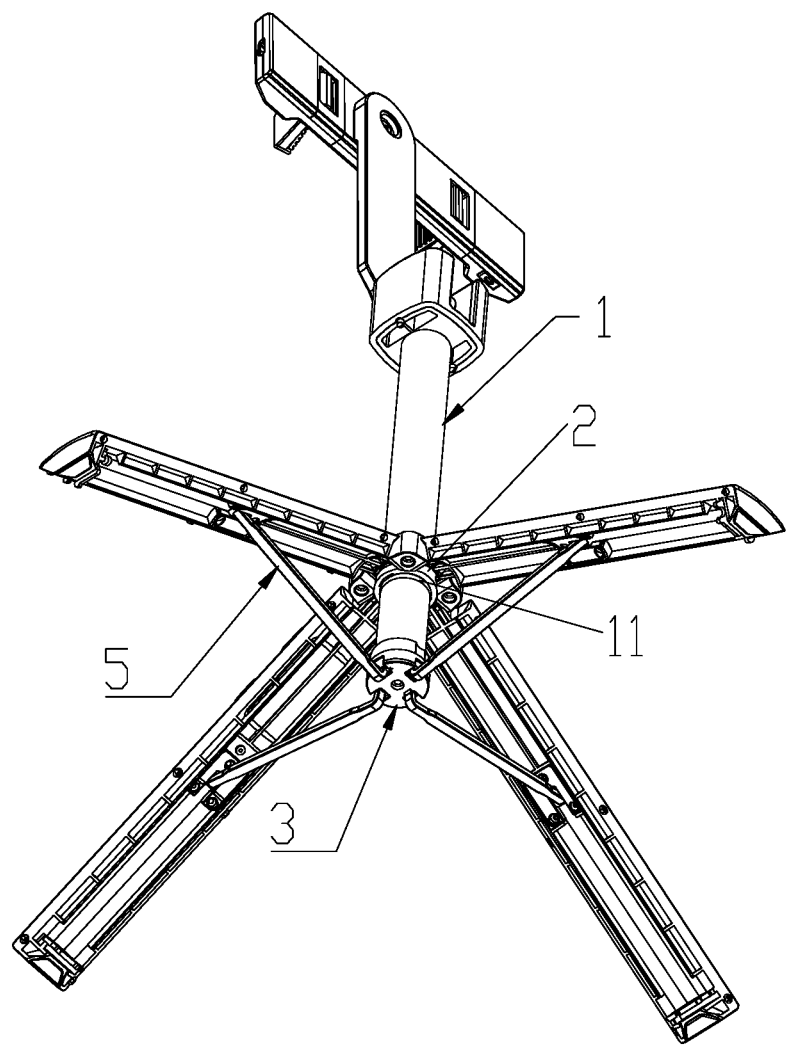
FIG. 2 is a schematic structural diagram of another angle of the fixing bracket for the photographing device shown in FIG. 1.

As shown in FIG. 1 and FIG. 2, the first embodiment of the present disclosure provides a fixing bracket for a photographing device, including a rod member 1, a sliding member 2, a tail plug 3, a plurality of supporting feet 4, and a supporting frame.

The sliding member 2 is slidably sleeved on an outer surface of the rod member 1, top ends of the plurality of supporting feet 4 are hinged to the sliding member 2, and the supporting feet 4 swing with respect to the sliding member. A tail plug 3 is disposed at a bottom end of the rod member 1.

The supporting frame includes a plurality of connecting rods 5, top ends of the plurality of the connecting rods 5 are hinged with the supporting feet 4, bottom ends of the plurality of the connecting rods 5 are hinged with the tail plug 3 at the bottom end of the rod member 1.

At least one limiting protrusion 11 is disposed on the outer surface of the rod member 1 close to a bottom end of the rod member 1, the at least one limiting protrusion 11 is configured to block the sliding member 2 (or the supporting feet 4) from sliding towards the bottom end of the rod member 1, the at least one limiting protrusion 11 is disposed between the sliding member 2 and the bottom end of the rod member 1. Therefore, the sliding member 2 is capable of sliding in an axial direction of the rod member 1, but a movement range of the sliding member 2 cannot exceed the at least one limiting protrusion 11.

When the supporting frame is unfolded, the supporting frame upwardly supports the supporting feet 4 to increase stability of the supporting feet 4, and the supporting frame cooperates with the sliding member 2 and the at least one limiting protrusion 11 to keep an unfolded angle of the supporting feet 4 unchanged after being unfolded.

In the embodiment, the at least one limiting protrusion 11 is at least one structure outwardly protruding from the rod member 1. Specifically, the at least one limiting protrusion 11 is at least one convex hull on the outer surface of the rod member, and a number of the at least one convex hull is not limited. When the number of the at least one convex hull is more than one, the at least one convex hull is circumferentially spaced apart along the outer surface of the rod member 1. Or the at least one limiting protrusion is an annular convex rib surrounding the surface of the rod member. In actual production, the at least one convex hull or the annular convex rib may be directly formed by extending a wall body of the rod member 1 in an outward direction, or may be fixed on the outer surface of the rod member 1 in a fixed manner.

Figure 3:
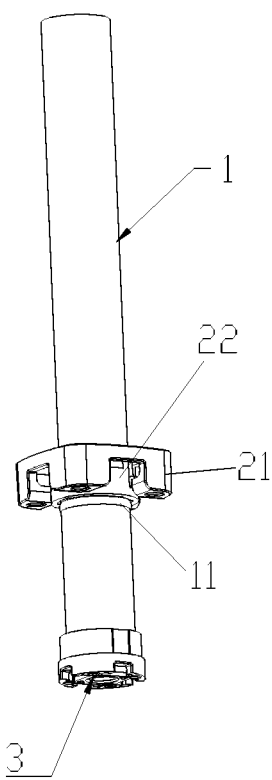
FIG. 3 is a structural schematic structural diagram of a rod member, a sliding member, and a tail plug of the fixing bracket for the photographing device shown in FIG. 1.

Hinge holes are defined in a circumferential direction of the sliding member 2, and the hinge holes are configured to be hinged with the supporting feet 4. The sliding member 2 may be a structural member only configured to connect to the supporting feet 4, the sliding member 2 may also be a cylinder combined a structure connected to the support feet 4 with a structure configured to install the remote control. As shown in FIG. 3, the sliding member 2 includes a hinge member 21 and a sliding sleeve 22, the sliding sleeve 22 is fixedly embedded in an inner ring of the hinge member 21, and the sliding sleeve 22 is sleeved on an outer periphery of the rod member 1.

According to the fixing bracket of the photographing device of the present disclosure, at least one limiting protrusion 11 is disposed on the outer surface of the rod member 1 close to the bottom end of the rod member 1, the at least one limiting protrusion 11 is disposed between the sliding member 2 and the bottom end of the rod member 1. When the sliding member 2 slides towards the bottom end of the rod member 1, the supporting feet 4 are gradually unfolded, when the sliding member 2 slides to a position where the sliding member 2 spatially interferes with the at least one limiting protrusion 11, the at least one limiting protrusion 11 blocks the sliding member 2 from continuing to slide towards the bottom end of the rod member 1. Since the sliding member 2 is hinged to the bottom ends of the supporting feet 4, when the sliding member 2 stops sliding, the unfolding angle of the supporting feet 4 is also kept fixed, so that the problem that the supporting feet 4 are reversely folded or damaged due to the too large unfolding angle is prevented, and a stable supporting function of the fixing bracket is ensured.

Second Embodiment

The second embodiment of the present disclosure provides a fixing bracket for a photographing device, differences between the second embodiment and the first embodiment 1 are as follows.

Figure 4:
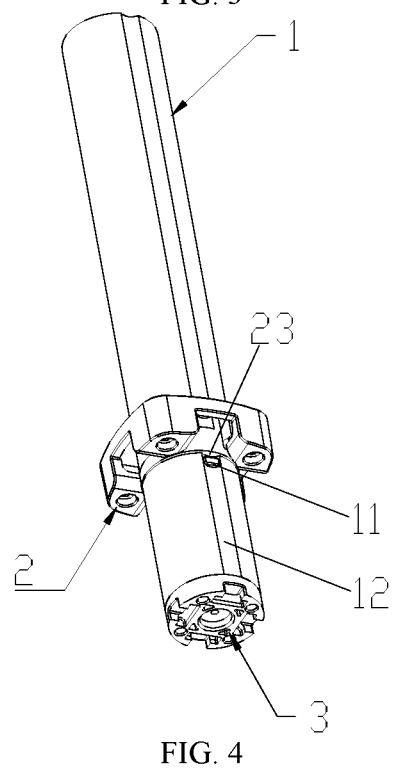
FIG. 4 is a structural schematic structural diagram of the rod member, the sliding member, and the tail plug of the fixing bracket for the photographing device according to a second embodiment of the present disclosure.
Figure 5:
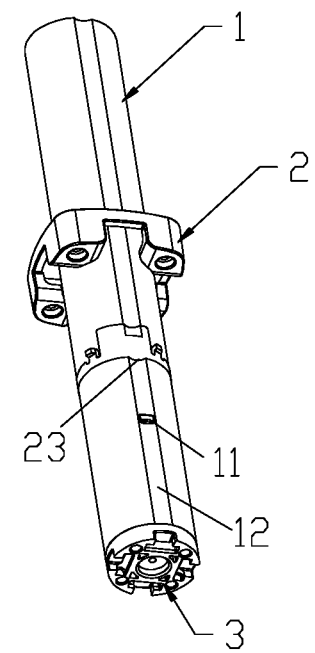
FIG. 5 is a structural schematic diagram of an exploded structure of the rod member, the sliding member, and the tail plug shown in FIG. 4.

As shown in FIGS. 4-5, in the embodiment, at least one sliding groove 12 is defined on the outer surface of the rod member 1 along an axial direction of the rod member 1, at least one guide protrusion 23 with respect to the at least one sliding groove 12 is disposed on the sliding member 2, and the at least one guide protrusion 23 is embedded in the at least one sliding groove 12, the at least one limiting protrusion 11 is disposed in the at least one sliding groove 12. When the sliding member 2 slides to a position where the sliding member 2 contacts with the at least one limiting protrusion 11, the at least one guide protrusion 23 on the sliding member 2 spatially interferes with the at least one limiting protrusion 11 in the at least one sliding groove 12, the at least one limiting protrusion 11 abuts against the at least one guide protrusion 23, thereby preventing the sliding member 2 from continuing to slide towards the bottom end of the rod member 1, and realizing a function of preventing the support feet 4 from being reversely folded.

Third Embodiment

The third embodiment of the present disclosure provides a fixing bracket for a photographing device, differences between the third embodiment and the first embodiment are as follows.

Figure 6:
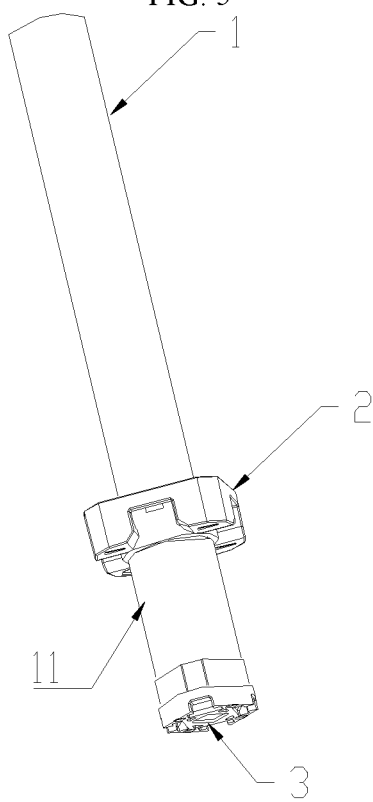
FIG. 6 is a structural schematic diagram of the rod member, the sliding member, and the tail plug of the fixing bracket for the photographing device according to a third embodiment of the present disclosure.
Figure 7:
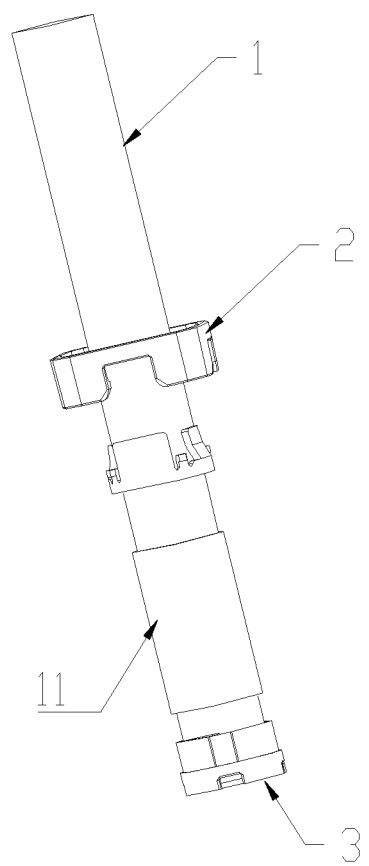
FIG. 7 is a structural schematic diagram of an exploded structure of the rod member, the slider, and the tail plug shown in FIG. 6.

As shown in FIG. 6 and FIG. 7, in the embodiment, the at least one limiting protrusion 11 is a sleeve sleeved on the rod member 1, a port at a top end of the sleeve serves as a structure for blocking the sliding member 2. A tail plug 3 is disposed at the bottom end of the rod member 1, the tail plug 3 is configured to block the sleeve from sliding away from the rod member 1. It is easy to understand that the sleeve may be a movable member, which is movably sleeved on the rod member 1, but cannot slide away from the rod member 1 under blocking of the tail plug 3. The sleeve may also be a member that is fixedly connected with the tail plug 3 or the rod member 1.

The sleeve of the embodiment is not directly extended from the rod member 1, and may be separately produced and then sleeved on the periphery of the rod member 1. Therefore, a structure and a production process of the rod member 1 may be simplified.

The above descriptions are only preferred embodiments of the present disclosure and are not intended to limit the present disclosure. Any modification, equivalent replacement, improvement, etc. made within spirit and principle of the present disclosure should be included in a protection scope of the present disclosure.

What is claimed is:

1. A fixing bracket for a photographing device, comprising:
    a rod member;
    a sliding member;
    a plurality of supporting feet; and
    a supporting frame;
    wherein the sliding member is slidably sleeved on an outer surface of the rod member, top ends of the plurality of the supporting feet are hinged to the sliding member, and the supporting feet are swingable with respect to the sliding member; at least one limiting protrusion is disposed on the outer surface of the rod member close to a bottom end of the rod member, the at least one limiting protrusion is configured to block the sliding member or the supporting feet from sliding towards the bottom end of the rod member, the at least one limiting protrusion is disposed between the sliding member and the bottom end of the rod member, the supporting frame comprises a plurality of connecting rods, top ends of the plurality of the connecting rods are hinged with the supporting feet, and bottom ends of the connecting rods are hinged with the bottom end of the rod member; the at least one limiting protrusion is at least one structure outwardly protruding from the rod member, or the at least one limiting protrusion is a sleeve sleeved on the rod member, wherein the at least one limiting protrusion is at least one convex hull on the outer surface of the rod member or the at least one limiting protrusion is an annular convex rib surrounding the outer surface of the rod member, wherein the at least one convex hull or the annular convex rib is directly formed by extending a wall body of the rod member in an outward direction.

2. The fixing bracket for the photographing device according to claim 1, wherein a tail plug is disposed at the bottom end of the rod member, and the tail plug is configured to block the sleeve from sliding away from the rod member.

3. The fixing bracket for the photographing device according to claim 2, wherein the sliding member is a hinge member, hinge holes are defined in a circumferential direction of the sliding member, and the hinge holes are configured to be hinged with the supporting feet.

4. The fixing bracket for the photographing device according to claim 2, wherein the sliding member comprises a hinge member and a sliding sleeve, the sliding sleeve is fixedly embedded in an inner ring of the hinge member, and the sliding sleeve is sleeved on an outer periphery of the rod member.

5. The fixing bracket for the photographing device according to claim 2, wherein the sliding member is a cylinder for installing a remote control.

6. The fixing bracket for the photographing device according to claim 2, wherein at least one sliding groove is defined on the outer surface of the rod member along an axial direction of the rod member, at least one guide protrusion with respect to the at least one sliding groove is disposed on the sliding member, the at least one guide protrusion is embedded in the at least one sliding groove, and the at least one limiting protrusion is disposed in the at least one sliding groove and is capable of abutting against the at least one guide protrusion.

7. The fixing bracket for the photographing device according to claim 1, wherein the sliding member is a hinge member, hinge holes are defined in a circumferential direction of the sliding member, and the hinge holes are configured to be hinged with the supporting feet.

8. The fixing bracket for the photographing device according to claim 1, wherein the sliding member comprises a hinge member and a sliding sleeve, the sliding sleeve is fixedly embedded in an inner ring of the hinge member, and the sliding sleeve is sleeved on an outer periphery of the rod member.

9. The fixing bracket for the photographing device according to claim 1, wherein the sliding member is a cylinder for installing a remote control.

10. The fixing bracket for the photographing device according to claim 1, wherein at least one sliding groove is defined on the outer surface of the rod member along an axial direction of the rod member, at least one guide protrusion with respect to the at least one sliding groove is disposed on the sliding member, the at least one guide protrusion is embedded in the at least one sliding groove, and the at least one limiting protrusion is disposed in the at least one sliding groove and is capable of abutting against the at least one guide protrusion.

11. The fixing bracket for the photographing device according to claim 1, wherein the at least one limiting protrusion and the rod member are integrally formed as a single piece.

* * * * *